(12) United States Patent
Avritzer et al.

(10) Patent No.: US 8,930,284 B2
(45) Date of Patent: Jan. 6, 2015

(54) EXTENDED SYSTEM AVERAGE INTERRUPTION DURATION INDEX (ESAIDI) METRIC TO ASSESS THE SYSTEM RELIABILITY IMPACT OF DISTRIBUTION AUTOMATION FAILURES

(75) Inventors: Alberto Avritzer, Mountainside, NJ (US); Sindhu Suresh, Monroe Township, NJ (US)

(73) Assignee: Siemens Aktiengesellschaft, Munich (DE)

( * ) Notice: Subject to any disclaimer, the term of this patent is extended or adjusted under 35 U.S.C. 154(b) by 294 days.

(21) Appl. No.: 13/568,257

(22) Filed: Aug. 7, 2012

(65) Prior Publication Data

US 2013/0191320 A1    Jul. 25, 2013

Related U.S. Application Data

(60) Provisional application No. 61/590,464, filed on Jan. 25, 2012, provisional application No. 61/635,416, filed on Apr. 19, 2012.

(51) Int. Cl.

| | |
|---|---|
| *G06E 1/00* | (2006.01) |
| *G06E 3/00* | (2006.01) |
| *G06F 15/00* | (2006.01) |
| *G06G 7/00* | (2006.01) |
| *G06N 99/00* | (2010.01) |

(52) U.S. Cl.
USPC .......................................................... 706/10

(58) Field of Classification Search
CPC .......... G01R 15/05; G01R 5/142; G06E 1/00; G06E 3/00; G06E 7/00
See application file for complete search history.

(56) References Cited

U.S. PATENT DOCUMENTS

| | | |
|---|---|---|
| 7,284,274 B1 | 10/2007 | Walls et al. |
| 2008/0077336 A1* | 3/2008 | Fernandes ...................... 702/57 |
| 2011/0072315 A1 | 3/2011 | Avritzer |

OTHER PUBLICATIONS

Survivability Models for the Assessment of Smart Grid Distribution Automation Network Designs: Avritzer, ACM, 978-1-4503, pp. 241-252.*
Survivability Analysis of Power Distribution in Smart Grids with Active and Reactive Power Modeling: Menasche, 2012, Performance Evaluation Review, pp. 53-57.*

(Continued)

*Primary Examiner* — Kakali Chaki
*Assistant Examiner* — Peter Coughlan

(57) ABSTRACT

A method for assessing survivability of a distributed automation power grid due to a failure including: identifying a location of a failed section of a grid and isolating the section; aggregating sections of the grid downstream from the failed section into a first group and sections of the grid upstream from the failed section into a second group; computing, using a Markov chain, a first parameter indicating whether a communication network of the grid is operational after the failure; computing, using a Markov chain, a second parameter indicating whether enough backup energy exists for the second group after the failure; and computing, using a Markov chain, a third parameter based on the first and second parameters, wherein the third parameter is indicative of the time required for the grid to be restored to its operating state prior to the failure, and the third parameter is computed by evaluating $$ESAIDI(\tau) = \sum_{j=1}^{c} \phi_j \tau \left( \frac{M_j(\tau)}{D_j(\tau)} \right).$$

16 Claims, 6 Drawing Sheets

(56) References Cited

OTHER PUBLICATIONS

Smart Grid Reliability Assessment Under Variable Weather Conditions: Islam, 2009, Univ of South Florida.*

A. Avritzer and E.J. Weyuker. Metrics to Assess the Likelihood of Project Success Based on Architecture Reviews, Empirical Software Engineering, 4, 199-215 (1999).

Alberto Avritzer and Elaine J. Weyuker. The automatic generation of load test suites and the assessment of the resulting software. IEEE Trans. Softw. Eng., 21(9):705-716, 1995.

S.H. Houmb, V.N.L. Franqueira, Erlend. A. Engum, Estimating Impact and Frequency of Risk to Safety and Mission Critical Systems Using CVSS, WDSE 2008, Seattle, Nov. 2008.

A. Avritzer, E. de Souza e Silva, R.M.M. Le ao, and E.J. Weyuker. Automated generation of test cases using a performability model. IET Software, 5(2):113-119, 2011.

A.A.Chowdhury, S. Agarwal, and D. Koval. Reliability modeling of distributed generation in conventional distribution systems planning and analysis. IEEE Transactions on Industry Applications, 39(5):1493-1498, 2003.

S. Keshav and C. Rosenberg. How internet concepts and technologies can help green and smarten the electrical grid. ACM SIGCOMM Computer Communication Review, 2011.

Ardakanian O., Keshav, S. and Rosemberg C., Markovian Models for Home Energy Consumption, ACM Sigcomm/GreenNet'11, Aug. 2011, Toronto, Canada, pp. 31-36.

Alberto Avritzer and Elaine J. Weyuker. The role of modeling in the performance testing of e-commerce applications. IEEE Trans. Softw. Eng. 30(12):1072-1083, 2044.

* cited by examiner (a)

(b)

EXTENDED SYSTEM AVERAGE INTERRUPTION DURATION INDEX (ESAIDI) METRIC TO ASSESS THE SYSTEM RELIABILITY IMPACT OF DISTRIBUTION AUTOMATION FAILURES

CROSS-REFERENCE TO RELATED APPLICATIONS

This application claims priority under 35 U.S.C. §119 to U.S. provisional application No. 61/590,464 filed Jan. 25, 2012 and U.S. provisional application No. 61/635,416 filed Apr. 19, 2012, the disclosures of which are incorporated by reference herein in their entireties.

BACKGROUND OF THE INVENTION

1. Technical Field

The present invention relates to smart grid distribution automation networks, and more particularly, to a metric for assessing the survivability of such network designs after a failure.

2. Discussion of the Related Art

Distribution Automation (DA) is a feature in power distribution networks to automatically detect, isolate and restore power after failure events. SAIDI (System Average Interruption Duration Index) is a very important measure of power reliability. It is a measure of customer average impact of system interruptions as it computes the sum of customer interruption durations over the total number of customers.

Traditionally, the reliability of power systems has been quantified using average metrics, such as SAIDI. Some of the United States public service commission's use SAIDI to assess utilities' compliance with the commission rules. SAIDI was developed to track manual restoration times, and according to Standard 166-1998, the median value for North American utilities is roughly one and a half hours. In smart grid networks, power failure and restoration events will have a finer level of granularity, due to the deployment of reclosers, which isolate faulty sections, and demand side management system activities, such as distributed generators and demand response application systems. Therefore, there is a need to extend the SAIDI metric, and to develop new models and tools for the accurate computation of customer interruption indexes after power failure events occur, even if the occurrence of such events is rare. The survivability of a mission-critical application is the ability of the system to continue functioning during and after a failure or disturbance.

SUMMARY OF THE INVENTION

In an exemplary embodiment of the present invention, there is provided a method for assessing the survivability of a distributed automation power grid in response to a failure, comprising: generating a failure in a first section of a distributed automation power grid, wherein the grid is divided into a plurality of sections; identifying the location of the first section and isolating the first section; aggregating sections of the grid that are downstream from the first section into a first group and sections of the grid that are upstream from the first section into a second group; computing, using a first Markov chain, a first parameter indicating whether a communication network of the grid is operational after the failure; computing, using a second Markov chain, a second parameter indicating whether enough backup energy exists for the second group after the failure; and computing, using a third Markov chain, a third parameter based on the first and second parameters, wherein the third parameter is indicative of the economic loss due to failure, as for example: energy not supplied during failure recovery time, the number of customers impacted during failure recovery time, or time required for the grid to be restored to its operating state prior to the failure. The third parameter is computed by evaluating $$ESAIDI(\tau) = \sum_{j=1}^{C} \phi_j \tau \left( \frac{\overline{M}_j(\tau)}{\overline{D}_j(\tau)} \right).$$

After isolating the first section an initial transition to a state of the first to third Markov chains is based on a probability that the communication network is operational after the failure and a probability that enough backup energy exists for the second group after the failure.

The method further comprises: determining, based on the third parameter, an infrastructure investment to the distributed automation power grid.

A state of the first Markov chain is defined as a number of good paths between the distributed automation power grid and a central controller of the distributed automation power grid and transitions in the first Markov chain represent communication path failures and communication path repairs.

A state of the second Markov chain is defined as a difference between available power for back-up failure, restoration and power demand and transitions in the second Markov chain represent changes in available back-up power due to initiation of additional back-up units or reduced demand.

A state of the third Markov chain is defined by aggregating all of the distributed automation power grid elements that have power related equivalent behavior in terms of failure isolation and restoration and transitions in the third Markov chain represent rates at which failure isolation and restoration operations are performed.

The third parameter is computed by evaluating the time required to transition from the initial failure state to the state that represents the successful execution of the failure identification, isolation and restoration operations.

Reactive power is incorporated into the second and third Markov chains.

In an exemplary embodiment of the present invention, there is provided a system for assessing the survivability of a distributed automation power grid in response to a failure, comprising: a memory device for storing a program; a processor in communication with the memory device, the processor operative with the program to: generate a failure in a first section of a distributed automation power grid, wherein the grid is divided into a plurality of sections; identify the location of the first section and isolating the first section; aggregate sections of the grid that are downstream from the first section into a first group and sections of the grid that are upstream from the first section into a second group; compute, using a first Markov chain, a first parameter indicating whether a communication network of the grid is operational after the failure; compute, using a second Markov chain, a second parameter indicating whether enough backup energy exists for the second group after the failure; and compute, using a third Markov chain, a third parameter based on the first and second parameters, wherein the third parameter is indicative of the time required for the grid to be restored to its operating state prior to the failure. A state of the first Markov chain is defined as a number of good paths between the distributed automation power grid and a central controller of the distributed automation power grid and transitions in the first Markov chain represent communication path failures and communication path repairs. A state of the second Markov chain is defined as a difference between available power for back-up failure, restoration and power demand and transitions in the second Markov chain represent changes in available back-up power due to initiation of additional back-up units or reduced demand.

The third parameter is computed by evaluating $$ESAIDI(\tau) = \sum_{j=1}^{C} \phi_j \tau \left( \frac{\overline{M}_j(\tau)}{\overline{D}_j(\tau)} \right).$$

After isolating the first section an initial transition to a state of the first to third Markov chains is based on a probability that the communication network is operational after the failure and a probability that enough backup energy exists for the second group after the failure.

The processor is further operative with the program to: determine, based on the third parameter, an infrastructure investment to the distributed automation power grid.

A state of the third Markov chain is defined by aggregating all of the distributed automation power grid elements that have power related equivalent behavior in terms of failure isolation and restoration and transitions in the third Markov chain represent rates at which failure isolation and restoration operations are performed.

The third parameter is computed by evaluating the time required to transition from the initial failure state to the state that represents the successful execution of the failure identification, isolation and restoration operations.

Reactive power is incorporated into the second and third Markov chains.

In an exemplary embodiment of the present invention, there is provided a computer program product for assessing the survivability of a distributed automation power grid in response to a failure, comprising: a non-transitory computer readable storage medium having computer readable program code embodied therewith, the computer readable program code comprising: computer readable program code configured to perform the steps of: generating a failure in a first section of a distributed automation power grid, wherein the grid is divided into a plurality of sections; identifying the location of the first section and isolating the first section; aggregating sections of the grid that are downstream from the first section into a first group and sections of the grid that are upstream from the first section into a second group; computing, using a first Markov chain, a first parameter indicating whether a communication network of the grid is operational after the failure; computing, using a second Markov chain, a second parameter indicating whether enough backup energy exists for the second group after the failure; and computing, using a third Markov chain, a third parameter based on the first and second parameters, wherein the third parameter is indicative of the time required for the grid to be restored to its operating state prior to the failure. The third parameter is computed by evaluating $$ESAIDI(\tau) = \sum_{j=1}^{C} \phi_j \tau \left( \frac{\overline{M}_j(\tau)}{\overline{D}_j(\tau)} \right).$$

DETAILED DESCRIPTION OF EXEMPLARY EMBODIMENTS

Figure 1:
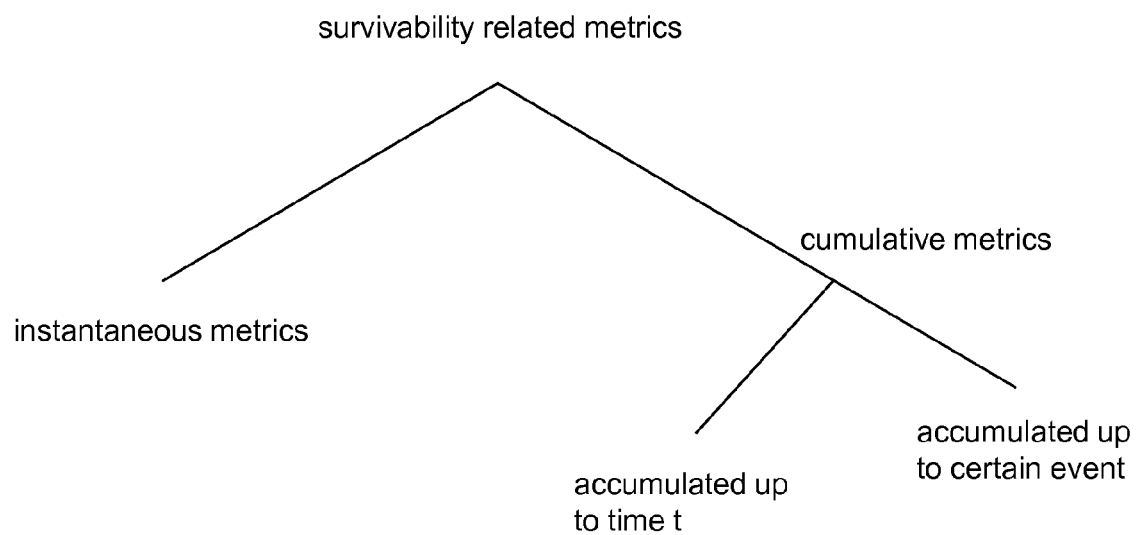
FIG. 1 is a taxonomy of survivability related metrics, according to an exemplary embodiment of the present invention.

In accordance with an exemplary embodiment of the present invention, presented herein is an analytical model to assess the survivability of distributed automation power grids. In this exemplary embodiment, a performability model is used to capture how the system recovers from a failure. The model accounts for the fact that the topology is sectionalized. Given a failure in section i, a key insight is to aggregate the sections of the network that may be fed by backup sources into a single node, denoted by i+. This aggregation allows transient metrics of the network to be efficiently quantified after a failure, also referred to as survivability metrics. For example, the model allows the computation of how the energy not supplied (ENS) after a failure varies over time as a function of available backup power, the demand response application and of the state of the information and communication network.

After a power failure event, some power grid areas of the network may experience restoration times of the order of magnitude of minutes, while other power grid areas may require hours for manual repair events to take place. The model allows for the accurate assessment of the power grid network survivability by tracking the time-dependent state of the system under study.

Some of the main contributions of this invention are the following.

Survivability model. Presented herein is a Markov chain model that supports the survivability assessment of power grid metrics accounting for the sectionalizing of distribution automation topology, the available excess power, the unreliability of the telecommunications network and the interaction with the demand response application. The model can be generated and solved in a cost-efficient manner.

Implications of system integration. The invention brings awareness to the importance of accurate holistic power engineering that considers the interactions between telecommunications reliability and the reliability benefits of integration with other distribution automation features, such as the integration of failure recovery with demand response. In particular, it is shown that if demand response can be activated after a failure occurs, the reliability of the system significantly increases.

Extension of the SAIDI metric to support distributed automation. The invention also presents an extension of the SAIDI metric that captures the dynamic nature of the smart-grid by taking into account the number of customers impacted by the service interruption, the service impact of the interruption (e.g., Energy not Supplied) and the duration of the recovery period. The analytical solution of the survivability model is used to capture the time spent in each state during the recovery period and the reward associated with each state to capture the service impact of the interruption.

Survivability metrics that can be derived from the inventive model will now be discussed.

Survivability is the ability of a system to continue to function during and after a disturbance. It has been defined by ANSI as the transient performance of a system after an undesirable event. The metrics used to quantify survivability vary according to applications, and depend on a number of factors such as the minimum level of performance necessary for the system to be considered functional, and the maximum acceptable outage duration of a system. Survivability metrics are transient metrics computed after the occurrence of a failure. In the remainder of this disclosure, time t refers to the time since a failure occurred and is measured in hours.

In an exemplary embodiment of the present invention, survivability metrics are computed with respect to a measure of interest M, also referred to as the performance metric. In the realm of power systems, an example of the performance metric M of interest could be the energy supplied per hour, measured in kilowatts. Assuming that M has value $\mu$ just before a failure occurs, the survivability behavior is quantified by attributes such as the relaxation time for the system to restore the value of M to $\mu$. In this disclosure, metrics related to the relaxation time are computed, focusing on the mean energy not supplied per hour after a failure occurs.

FIG. 1 shows the taxonomy of the survivability related metrics considered in this disclosure. Metrics are classified into two broad categories. Instantaneous metrics are transient metrics that capture the state of the system at time t. An example of an instantaneous metric is the probability that a given section i has been recovered by time t.

Cumulative metrics are obtained in the inventive model by assigning reward rates to system states. A reward is gained per time unit in a state, as determined by the reward rate assigned to that state. The accumulated reward is the result of the accumulation of rewards since the failure up to time t or up to a certain event. The mean accumulated downtime of a given section by time t and the mean accumulated energy not supplied by time t are examples of cumulative metrics computed up to time t. The mean accumulated energy not supplied up to the full recovery of the system is an example of a cumulative metric computed up to a certain event occurs. The mean time to recover a given section is also an example of the latter class of metrics, where the accumulated reward in this case is the time itself, obtained by assigning a reward of one per time unit at every state.

Now, one of the key metrics of interest in the realm of power systems, SAIDI, will be defined and extended according to an exemplary embodiment of the present invention. SAIDI is an important measure of the power utility's ability to cope with recovery from failures. It is a measure of average customer impact of system interruptions as it computes the sum of customer interruption durations over the total number of customers.

Given a topology with C sections, let N be the total number of customers and let $N_j$ be the average number of customers in the system impacted by a failure at section j, j=1, . . . , C.

Let $\phi_j$ be the mean outage duration due to all failures that occur at section j, during a pre-established large observation period. The observation period is usually assumed to be one year.

Definition 1. The SAIDI index is the average outage duration for each customer served.

$$SAIDI = \sum_{j=1}^{C} \varphi_j \frac{N_j}{N} \quad (1)$$

There is a need to extend SAIDI for the smart-grid environment because in the smart-grid infrastructure the number of customers impacted by a service interruption and the energy not supplied are governed by dynamic automated processes during the recovery period.

After a failure, the energy not supplied will vary over time during a multi-step recovery process. Let $m_j(t)$ be a random variable characterizing the energy not supplied per unit time after a failure in section j, j=C, t units of time after the failure. $m_j(t)$ accounts for the effect of one single failure in section j. Therefore, if a full system recovery occurs at time T, $m_j(t)=0$ for t≥T. Let $\overline{m}_j(t)$ be the mean value of $m_j(t)$.

Let $M_j(\tau)$ be the accumulated energy not supplied by time $\tau$ after a failure in section j, j=1, . . . , C, $$\overline{M}_j(\tau) = \int_t^\tau \overline{m}_j(t) dt, j=1, \ldots, C \quad (2)$$

Note that the total energy demanded per unit time can also vary during recovery. This occurs, for instance, if demand response is integrated with failure recovery. Let $d_j(t)$ be a random variable characterizing the total energy demanded per unit time at time t during the recovery from a failure in section j. Let $D_j(\tau)$ be the energy demanded over the first $\tau$ time units during the recovery from a failure in section j, $$\overline{D}_j(\tau) = \int_{t=0}^\tau \overline{d}_j(t) dt, j=1, \ldots, C \quad (3)$$

Let $\phi_j$ be the expected number of failures at section j during a pre-established large observation period (typically one year). The extended SAIDI index (ESAIDI) is defined as the outage duration accounting for the energy demanded and not supplied during the first $\tau$ units of time after a failure at a section, averaged over all sections.

Definition 2. The extended SAIDI index is given by $$ESAIDI(\tau) = \sum_{j=1}^{C} \phi_j \tau \left( \frac{\overline{M}j(\tau)}{\overline{D}j(\tau)} \right) \quad (4)$$

The inventive model used to compute survivability metrics of power distribution systems is now presented.

The methodology presented herein relies on these key principles: state space factorization, flexibility, state aggregation and initial state conditioning.

State space factorization. The methodology encompasses a set of models, where each model characterizes the system evolution after the failure of a given section. Given a topology with C sections, the methodology yields C models, where each model is tailored to the characteristics of the failed section. The advantages of such a space factorization include flexibility and reduced complexity as described below.

Flexibility: having a model tailored to a given section enables specific details to be captured about the impacts of failures on that particular section.

Figure 2:
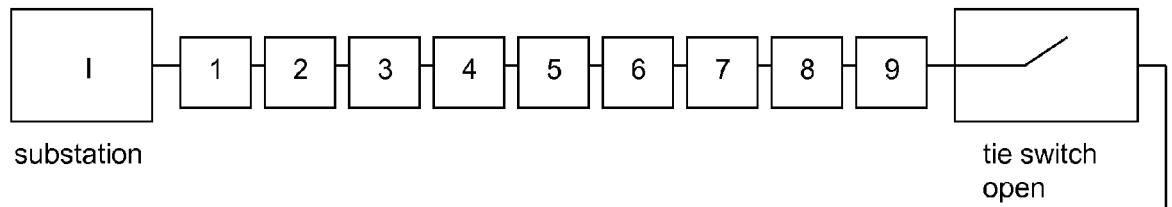
FIG. 2 illustrates a failed section and its upstream and downstream, according to an exemplary embodiment of the present invention.
Figure 2:
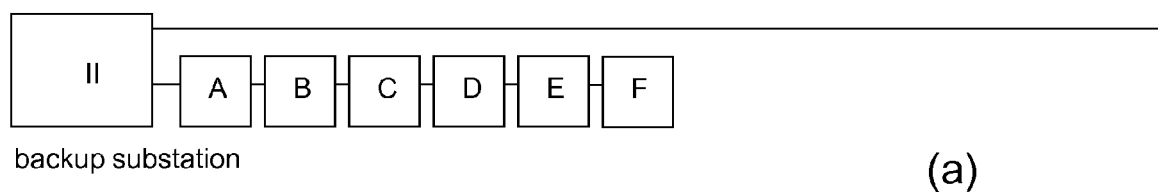
Figure 2:
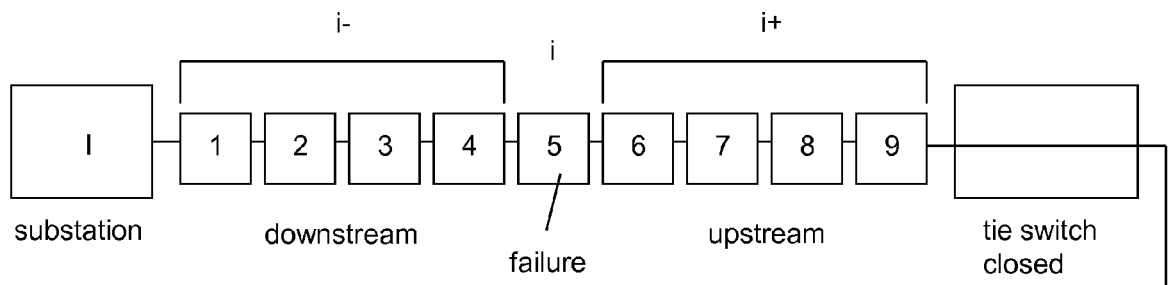
Figure 2:
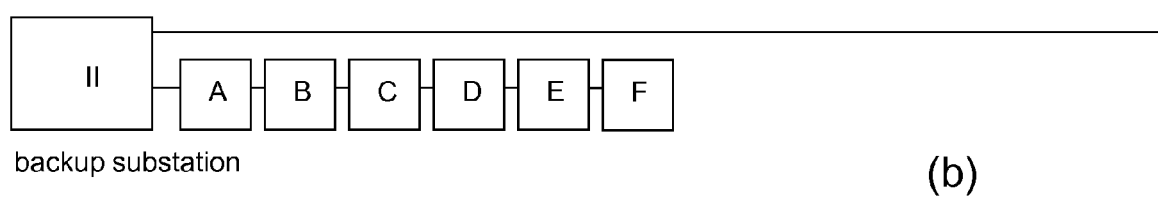

State aggregation. One of the insights of this disclosure is the observation that after a failure of a given section the remaining sections of the distribution automation topology can be aggregated into groups of affected and non-affected sections. In the scenario considered in the remainder of this disclosure, as shown in FIG. 2, after the failure of section i, section i is isolated and the non-failed sections can be aggregated into two groups: the downstream sections that are aggregated into a set of sections i− and are served by their original substation and the upstream sections that are aggregated into a set of sections i+ and might be served by a backup station, if enough backup power is available. State aggregation yields significant reduction in the computational complexity required to obtain the desired metrics, since the system state space can be described in terms of the aggregated section states.

Initial state conditioning. The computations of the metrics of interest are performed by assuming that the initial state is a failure state. The inventive models do not capture the failure rates of different components. Instead, the models are parameterized by using the conditional probability that specific system components are still operational after a specific section failure. In the remainder of this disclosure, conditional probabilities will be considered to account for the probability that a substation backup power is able to supply isolated sections (q), the reliability of the telecommunications network (p) and the effectiveness of the demand response application (r).

An overview of the inventive model is now provided.

Automatic and manual restoration events are initiated after a section failure event. The restoration process is a combination of electro-mechanical and computer-based events. In what follows, the sequence of events initiated after the failure of section i is described.

The isolation of the failed section is automatically performed by reclosers, within 10-50 ms after the failure, and power is instantaneously restored to the downstream sections (i−). The upstream sections (i+) have their power restored depending on the following factors: communication, backup power and demand response.

Communication. Communication is needed for all failure detection, isolation and recovery operations. In particular, communication is used by the supervisory control and data acquisition (SCADA) system at a substation to detect failure location, recalculate flow and close the tie switch to feed the upstream sections (i+).

Backup power. Sufficient spare backup power must be available at a backup substation.

Demand response. Demand response applications can reduce the load in the system after a failure, increasing the probability that the available backup power is able to supply energy to the upstream sections.

TABLE I

Model Parameters
(rates are given in units of events/hour)

| Parameter | Description | Value |
| --- | --- | --- |
| ϵ | Mean time for recloser to isolate failed section | ≈0 |
| α | Automatic restoration rate | 30 |
| β | Demand response rate | 4 |
| γ | Communication repair rate | 1 |
| ∂ | Manual repair rate | ¼ |

After a section failure, if the communication system is available and the backup power is able to restore energy to the upstream sections, it takes an average of 1-2 minutes to execute the automated restoration feature (see Table I). If there is not enough available backup power for the restoration of upstream sections, but communication is available, the demand response feature might be used to adjust the demand accordingly. When the demand response is effective, demand of sections i+ can be lowered to the target values within 15 minutes on average. If the communication system is not available after the section failure, a 1 hour repair time is required for manual restoration of the communication system. This time is dominated by the time it takes for a truck to arrive at the failure site.

Finally, section i may require manual repair, e.g., to remove weather related damage and restore the damaged components to their original condition. After section i is repaired, if the upstream sections are still not recovered, these sections will be connected to the main substation through section i. The average time to manually repair a section is 4 hours.

A description of the inventive model is now provided.

TABLE II

Table of Notation

| Variable | Description |
| --- | --- |
| C | Number of sections |
| i | Failed section |
| i+ | Upstream of section i (sections $\{i+1, \ldots, C\}$) |
| i− | Downstream of section i (sections $\{1, \ldots, i-1\}$) |
| p | Probability that communication works after failure |
| q | Probability that backup power suffices to supply isolated sections |
| r | Probability that demand response is effective after failure |

Figure 3:
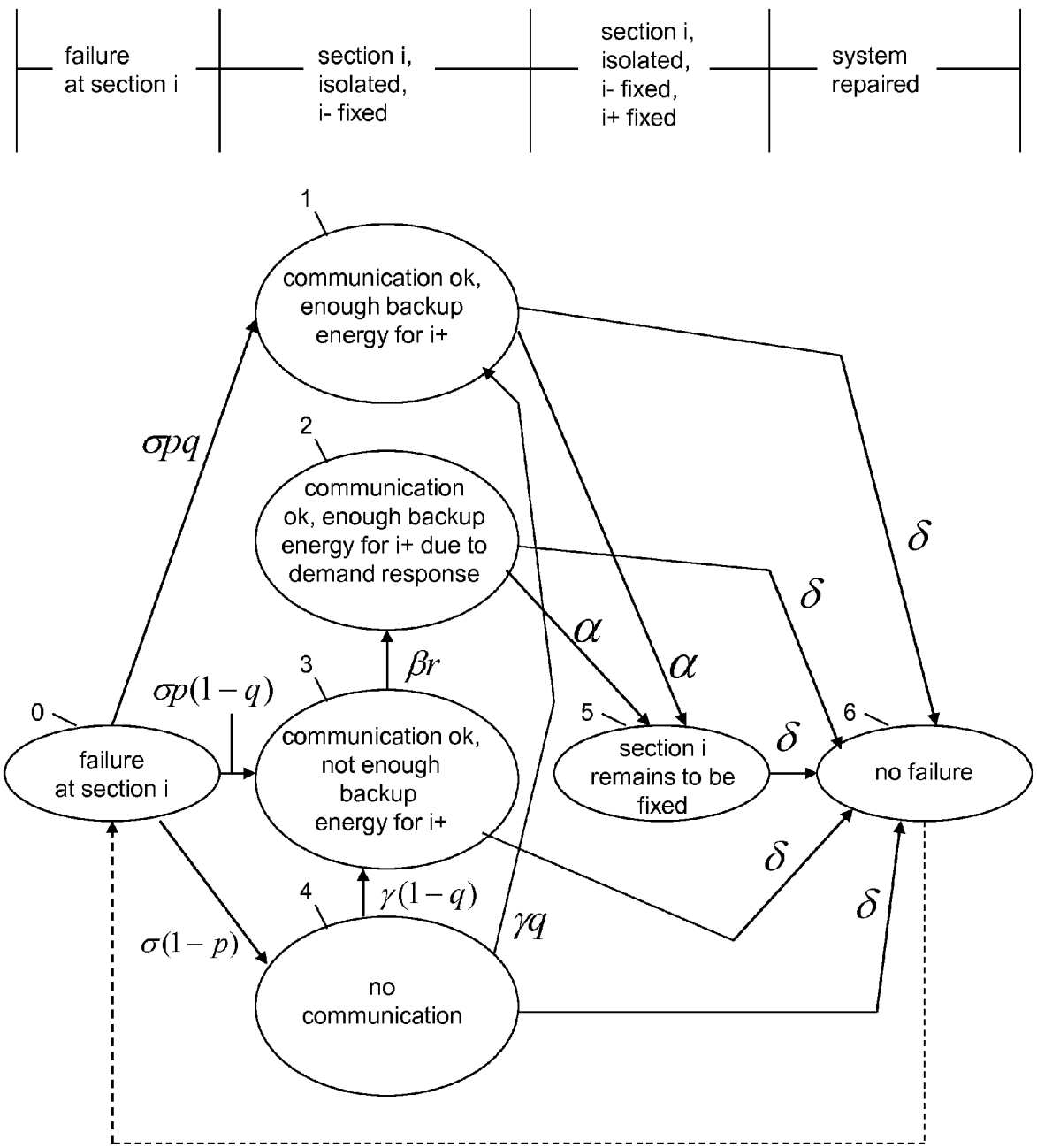
FIG. 3 illustrates a phase recovery model according to an exemplary embodiment of the present invention.

A Markov chain with rewards is used to model the phase recovery of the of the distribution automation network. The states of the model correspond to the different recovery phases at which the system might be found as shown in FIG. 3. Each state is associated with a reward rate that corresponds, for instance, to the energy not supplied per hour or the number of customers not served per hour in that state. In this disclosure, it is assumed that state residence times are exponentially distributed, which serves to illustrate the inventive methodology in a simple setting. The model may be extended to allow for general distributions for the state residence times. The system states and the state rewards are described in the following.

Phase recovery model. The phase recovery model is characterized by the following states and events.

As shown in FIG. 3, after a section failure, the model is initialized in state 0. The residence time at state 0 corresponds to the time required for the recloser to isolate the section, which takes an average of ϵ. As mentioned prior, a recloser isolates a section within 10-50 ms after a failure, so in the remainder of this disclosure it is assumed e=0. Let p be the probability that the communication network is still operational after a section failure and q be the probability that there is sufficient backup power to supply energy for sections i+. After the isolation of section i is completed the model transitions to one of three states:

1) With probability pq the model transitions to state 1, where the distribution network is amenable to automatic restoration, 2) With probability 1−p, the model transitions to state 4, where the communication system requires manual repair, which occurs at rate γ, or 3) With probability p(1−q) the model transitions to state 3, where the effectiveness of demand response will determine if the system is amenable to automatic restoration.

At state 3, demand response takes place after a period of time with average duration $1/\beta$. Let r be the probability that demand response effectively reduces the load of the system to a level that is supported by the backup substation. In this case, the model transitions from state 3 to state 2 with rate $\beta r$. When the model is in states 1 or 2 the distribution network is amenable to automatic restoration, which occurs after a period of time with average duration $1/\alpha$. What distinguishes state 1 from state 2 is the fact that state 1 can be reached in one step transition after a failure, whereas state 2 is reached only after the successful activation of the demand response feature. Therefore, the state reward rates associated to states 1 and 2, such as the energy not supplied per hour at those states, are usually different. A manual repair of section i takes on average $1/\delta$ hours (and can occur while the system is in states 1-5). After a manual repair, the model transitions to state 6, which corresponds to a fully repaired system.

The computation of the survivability metric (Energy Not Supplied) will now be described by using the phase recovery model descried in FIG. 3. In each state of the model of FIG. 3 the energy not supplied per hour at that state is associated as the sate reward state. Let $\pi_k(t)$ be the transient probability associated with state k and $\sigma_k$ be the reward rate (e.g., mean energy not supplied per hour) associated with state k, k= 0, . . . , 6. Let L(t) be a random variable characterizing the reward accumulated time t after a failure (e.g., accumulated energy not supplied by time t). The mean reward accumulated by time t is $$\overline{L}(t) = \sum_{k=0}^{6} \int_{y=0}^{t} \sigma_k \pi_k(y) d_y \quad (5)$$

Let $s_k$ be the residence time at state k before reaching state 6 (i.e., up to full system recovery), k=0, . . . , 5. Let L be a random variable characterizing the accumulated energy not supplied up to full system recovery. The mean reward accumulated up to full system recovery is $$\overline{L} = \lim_{t \to \infty} \overline{L}(t) = \sum_{k=0}^{5} \sigma_k \overline{s}k \quad (6)$$

Note that (5) is the mean energy not supplied in the interval [0, t] after a failure, is defined in (2).

Figure 4:
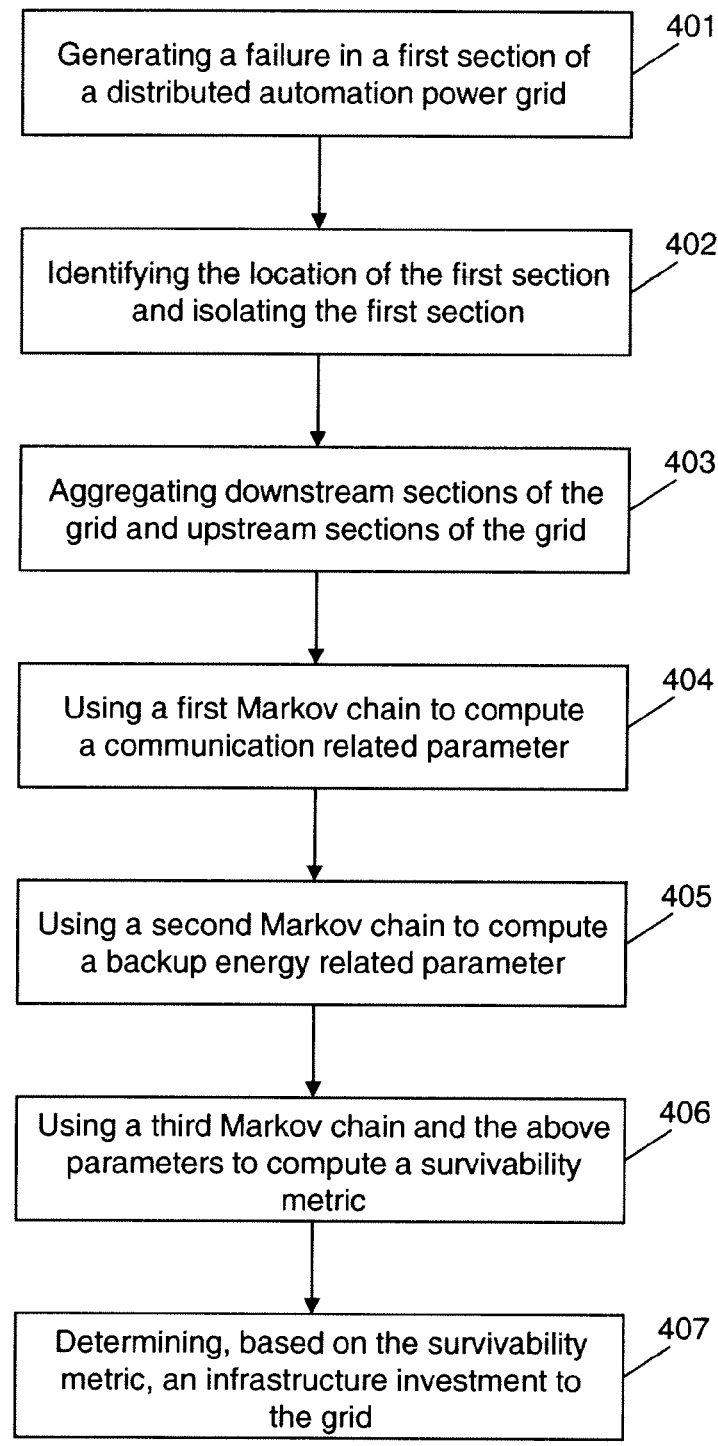
FIG. 4 is a flowchart illustrating an exemplary embodiment of the present invention.

FIG. 4 is a flowchart illustrating an exemplary embodiment of the present invention. Steps 401, 402 and 403 are related to the physical events impacting the state of the distribution automation network. As shown in FIG. 4, in step 401, a failure may be generated in a generic section i of a distributed automation power grid. As an example, section failures are usually caused by physical event (ice, down tree, summer storms, etc).

The failure may be in a generic section i in FIG. 2. In step 402, the location of the section i may be identified and isolated.

As discussed above, this process is fully automated and may occur in less than a second. In step 403, the sections of the grid that are downstream from the first section may be aggregated into a first group and the sections of the grid that are upstream from the first section may be aggregated into a second group. As shown in FIG. 2, the first group may be identified by i− and the second group may be identified by i+. This aggregation is done automatically by the electrical distribution network reclosers and takes much less than a second.

Step 404, 405, 406 and 407 are modeling steps used to compute the survivability metric.

In step 404, there is computed, using a first Markov chain, a first parameter indicating whether a communication network of the grid is operational after the failure. Communications are required to identify the failure location (section i). The first Markov chain may be referred to as a network communication failure based Markov chain for the distribution automation power grid. This Markov chain is used to compute the NetworkCommunicationIsOk parameter (first parameter) that is an input to the failure identification, isolation and restoration Markov chain (referred later to as the third Markov chain). The state of this Markov chain C is defined as the number of good paths between the distribution automation power grid and the distribution automation central controller. The transitions in this Markov chain represent communication path failures and communication path repairs. The NetworkCommunicationIsOk parameter is derived by computing the probability of C(1), i.e., the probability that at least one good network communication path exists between the distribution automation power grid and central controller.

At this time, with reference to FIG. 2, the downstream sections of the first group i− are served by substation I. The goal now is to determine if the upstream sections of the second group i+ can be served by backup substation II and, if not, how must the grid be reconfigured to provide these upstream sections with power in the event of an actual physical failure corresponding to the hypothetical one? This is accomplished by the following.

In step 405, there is computed, using a second Markov chain, a second parameter indicating whether enough backup energy exists for the second group after the failure. The second Markov chain may be referred to as a power demand Markov chain for the distribution automation power grid. This Markov chain is used to compute the AvailablePowerIsOk parameter (second parameter) that is an input to the failure identification, isolation and restoration Markov chain. The state of this Markov chain Q is defined as a difference between the available power for back-up failure restoration and the power demand in state Q. The transitions in this Markov chain represent changes in available back-up power due to initiation of additional back-up units (e.g. distributed generation or solar panels online) or due to reduced demand (e.g., activation of demand/response application, transition to off-peak configuration). The AvailablePowerIsOk parameter is derived by computing the summation of the probability of all states Q(I) for which I (the difference between available back-up power and required demand for failure restoration) is positive. Therefore, the AvailablePowerIsOk parameter is the probability that enough power exists in the back-up power supply to enable the successful execution of the automated failure restoration operation.

In step 406, there is computed, using a third Markov chain, a third parameter based on the first and second parameters, wherein the third parameter is indicative of the time required for the grid to be restored to its operating state prior to the failure. As mentioned above, the third Markov chain may be referred to as the failure identification, isolation and restoration Markov chain for the distributed automation power grid. This Markov chain is used to compute the Survivability metric. It uses as input the two parameters computed in steps 404 and 405: NetworkCommunicationIsOk and AvailablePowerIsOk. The state of this Markov chain F is defined by aggregating all the distribution automation power grid elements that have power related equivalent behavior in terms of failure isolation and restoration (section I impacted, NetworkCommunicationIsOk, AvailablePowerIsOk) and combinations of the above. The transitions in this Markov chain represent the rates at which changes in state of the failure isolation and restoration operations are performed: equivalent sections fixed or not fixed, demand response is activated, etc. The survivability parameter is computed by evaluating the time required to transition from the initial failure state to the state that represents the successful execution of the failure identification, isolation and restoration operation.

In step 407, based on the survivability metric, the power engineer may evaluate the required infrastructure investment to the distribution automation power grid network. For example, the power engineer may determine that the available back-up power in the network needs to be increased.

In this invention, introduced is a new approach for the evaluation of the likelihood of distributed automation power grid reliability survivability. In the above, we described the modeling approach to assess this metric. The approach consists of creating a power demand test suite and applying Markov modeling to the assessment of the power system survivability after the occurrence of a physical failure. The survivability test suite uses as input the list of the most likely failures and power load configurations. The output of the survivability testing phase is a metric that captures the required time for the power grid to return to correct operation after a physical failure. The distribution automation survivability metric is computed using three Markov chains, the power demand Markov chain, the network communications Markov chain, and the survivability Markov chain.

An exemplary function of this invention is to provide a tool to be used by power grid distribution automation engineers to assess the time required to recover from physical failures. Power engineers can use this tool to assess the reliability benefits of investing in the infrastructure for survivability. In addition, because the approach can be automatically executed, power engineers can also use the approach to dynamically track the survivability of their distributed automation power grids.

More specifically, by using this invention distribution automation power engineers will be able to automatically assess the investment tradeoffs involved in designing distribution automation power grids. Power engineers will be able to use the transient modeling approach to assess distribution automation power grid survivability after the occurrence of certain types of physical distribution automation failures. Power engineers will also be able to stochastically compute, using power demand based test case configurations, the survivability of power grid distribution automation systems.

The inventive method to assess the distributed automation power grid survivability condition on the occurrence of a physical failure shows superior performance because it has improved accuracy and efficiency.

As it pertains to accuracy, the test cases used for the evaluation of the survivability metric require detailed monitoring of demand and power availability. The survivability metric is computed for test cases representing the power demand defined usage and for each defined physical failure configuration. The distribution automation power grid survivability metric conditioned on the occurrence of a physical failure security shall be re-evaluated for significant changes in the available power generation sources and for significant changes in power demand.

As it pertains to efficiency, the derivation of a power demand test suite based on known power demand configurations and physical failures is an important advantage, as it allows the power engineer to focus on a significantly shorter list of likely physical failures. When new power demand types are introduced in the distribution automation power grid, the power demand test suite may be updated to account for the impact of these new demand types on the distribution automation power grid survivability.

The invention could also be generalized to automatically evaluate the required infrastructure investment to the distributed automation power grid network (as for example, increase the available back-up power), when the system survivability metric conditioned on physical distribution automation failures, (i.e., the time required for failure isolation, identification and restoration), crosses a pre-defined threshold. This generalization could require that this invention be applied to detect power demand and available power restoration capacity to detect demand response opportunities and back-up power shortages using online monitoring.

The inventive approach may be extended to incorporate reactive power into the holistic model for the assessment of large distributed automation power grids. In particular, reactive power is incorporated into the survivability Markov chain and the power demand/response Markov chain.

This extension uses the same network communication failure based Markov chain as described above, but extends the power demand Markov chain and failure identification, isolation and restoration Markov chain as follows.

Power demand Markov chain for the distribution automation power grid. This Markov chain is used to compute the AvailablePowerIsOk parameter that is an input to the failure identification, isolation and restoration Markov chain. This state of this Markov chain Q (active, reactive) is defined as difference between the available (active, reactive) power for back-up failure restoration and the (active, reactive) power demand in state Q (active, reactive). The transitions in this Markov chain represent changes in available back-up power due to initiation of additional active/reactive back-up units (e.g., distributed generation or solar panels online) or due to reduced demand (e.g., activation of demand/response application to reduce active or reactive power demand, transition to off-peak configuration). The AvailablePowerIsOk (active, reactive) parameter is derived by computing the summation of the probability of all states Q (active, reactive) (I) for which I (the difference between available active/reactive back-up power and required demand for failure restoration) is positive. Therefore, the AvailablePowerIsOk (active, reactive) parameter is the probability that enough power exists in the back-up active and reactive power supplies to enable the successful execution of the automated failure restoration operation.

Figure 5:
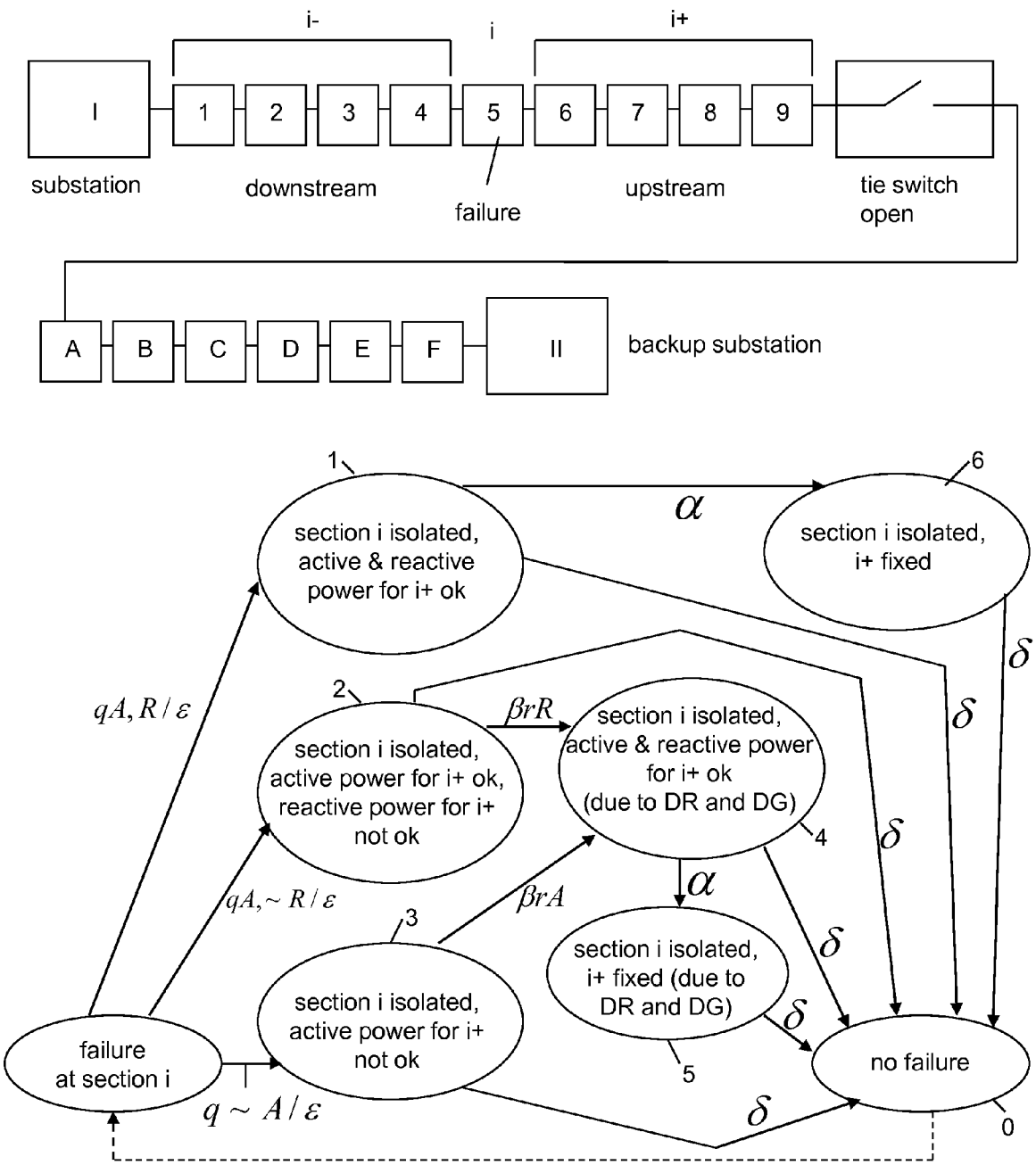
FIG. 5 illustrates a phase recovery model according to an exemplary embodiment of the present invention.

An implementation of a specific instance of the failure identification, isolation and restoration Markov chain for the distribution automation power grid is shown in FIG. 5. This Markov chain is used to compute the Survivability metric. It uses as input the two parameters computed in the network communication failure based Markov chain and the power demand Markov chain: NetworkCommunicationIsOk (p) and AvailablePowerIsOk (active, reactive): (qa, qr). The state of this Markov chain F is defined by aggregating all the distribution automation power grid elements that have power related equivalent behavior in terms of failure isolation and restoration (section I impacted, NetworkCommunicationsIsOk, AvailablePowerIsOk (active, reactive)) and combinations of the above. The transitions in this Markov chain represent the rates at which changes in state of the failure isolation and restoration operations are performed: equivalent sections fixed or not fixed, demand response is activated, etc. The survivability parameter is computed by evaluating the time required to transition from the initial failure state to the state that represents the successful execution of the failure identification, isolation and restoration operation. Other parameters used to specify the Markov chain are rates of transitions between states when repairs are possible: automated repair (alpha), demand response activated successfully (beta), manual repair (delta), high rate of transition from failure state (sigma).

FIG. 5 will now be described in detail.

After a failure at section i, power might become unavailable in other sections of the system due to cascading effects. The set of additional sections affected by a failure at section i are referred to as the upstream of i, or i+. A tie switch is used to control the flow of energy from a backup substation to i+.

Both electro-mechanical and computer-based strategies are used to address failures in an integrated manner. It takes an average of $\epsilon$ units of time for the failed section to be isolated. As the time for a section to be isolated is negligible, $\epsilon=0$.

After section i is isolated, the system transitions to states $s_1$, $s_2$ or $s_3$, depending on whether there is enough active and reactive power available to supply the upstream sections. If there is enough energy to supply i+ (state $s_1$), a tie switch is closed, energy is automatically restored, and the system transitions to state $s_6$ at rate $\alpha$. Otherwise (states $s_2$ and $s_3$), the demand response and distributed generation programs are activated, and it takes on average $1/\beta$ for them to take place. Such programs are effective with probability $r_R$ and $r_A$ at states $s_2$ and $s_3$, respectively. In case they are effective, a tie switch is closed and the system transitions from state $s_2$ and $s_3$, respectively, to state $s_4$. In state $s_4$, the upstream sections can be automatically restored. As in state $s_1$, the automatic restoration rate at state $s_4$ is $\alpha$. At states $s_5$ and $s_6$, only section i remains to be fixed. The manual repair rate occurs at rate $\delta$. A manual repair can take place from every state of the model, and yields a transition to state $s_0$ (full system recovery).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
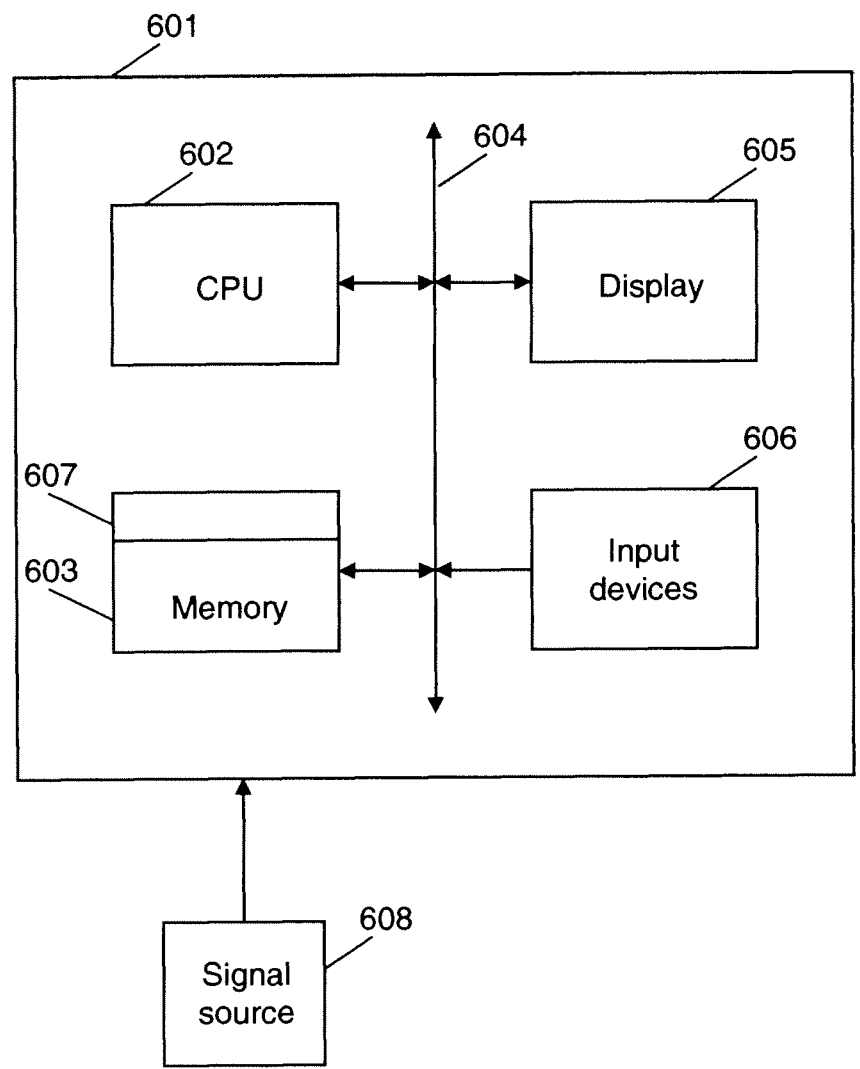
FIG. 6 illustrates a computer system in which an exemplary embodiment of the present invention may be implemented.

Referring now to FIG. 6, according to an exemplary embodiment of the present invention, a computer system 601 can comprise, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The support circuits can include circuits such as cache, power supplies, clock circuits, and a communications bus. The memory 603 can include RAM, ROM, disk drive, tape drive, etc., or a combination thereof. Exemplary embodiments of present invention may be implemented as a routine 607 stored in memory 603 (e.g., a non-transitory computer-readable storage medium) and executed by the CPU 602 to process the signal from a signal source 608. As such, the computer system 601 is a general-purpose computer system that becomes a specific purpose computer system when executing the routine 607 of the present invention.

The computer system 601 also includes an operating system and micro-instruction code. The various processes and functions described herein may either be part of the micro-instruction code or part of the application program (or a combination thereof) which is executed via the operating system. In addition, various other peripheral devices may be connected to the computer system 601 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A method for assessing the survivability of a distributed automation power grid in response to a failure, comprising:
   generating a failure in a first section of a distributed automation power grid, wherein the grid is divided into a plurality of sections;
   identifying the location of the first section and isolating the first section;
   aggregating sections of the grid that are downstream from the first section into a first group and sections of the grid that are upstream from the first section into a second group;
   computing, using a first Markov chain, a first parameter indicating whether a communication network of the grid is operational after the failure;
   computing, using a second Markov chain, a second parameter indicating whether enough backup energy exists for the second group after the failure; and
   computing, using a third Markov chain, a third parameter based on the first and second parameters, wherein the third parameter is indicative of the time required for the grid to be restored to its operating state prior to the failure, and the third parameter is computed by evaluating $$ESAIDI(\tau) = \sum_{j=1}^{C} \phi_j \tau \left( \frac{\overline{M}j(\tau)}{\overline{D}j(\tau)} \right).$$

2. The method of claim 1, wherein after isolating the first section an initial transition to a state of the first to third Markov chains is based on a probability that the communication network is operational after the failure and a probability that enough backup energy exists for the second group after the failure.

3. The method of claim 1, further comprising:
   determining, based on the third parameter, an infrastructure investment to the distributed automation power grid.

4. The method of claim 1, wherein a state of the first Markov chain is defined as a number of good paths between the distributed automation power grid and a central controller of the distributed automation power grid and transitions in the first Markov chain represent communication path failures and communication path repairs.

5. The method of claim 4, wherein a state of the second Markov chain is defined as a difference between available power for back-up failure, restoration and power demand and transitions in the second Markov chain represent changes in available back-up power due to initiation of additional back-up units or reduced demand.

6. The method of claim 5, wherein a state of the third Markov chain is defined by aggregating all of the distributed automation power grid elements that have power related equivalent behavior in terms of failure isolation and restoration and transitions in the third Markov chain represent rates at which failure isolation and restoration operations are performed.

7. The method of claim 6, wherein the third parameter is computed by evaluating the time required to transition from the initial failure state to the state that represents the successful execution of the failure identification, isolation and restoration operations.

8. The method of claim 1, wherein reactive power is incorporated into the second and third Markov chains.

9. A system for assessing the survivability of a distributed automation power grid in response to a failure, comprising:
a memory device for storing a program;
a processor in communication with the memory device, the processor operative with the program to:
generate a failure in a first section of a distributed automation power grid, wherein the grid is divided into a plurality of sections;
identify the location of the first section and isolating the first section;
aggregate sections of the grid that are downstream from the first section into a first group and sections of the grid that are upstream from the first section into a second group;
compute, using a first Markov chain, a first parameter indicating whether a communication network of the grid is operational after the failure;
compute, using a second Markov chain, a second parameter indicating whether enough backup energy exists for the second group after the failure; and
compute, using a third Markov chain, a third parameter based on the first and second parameters, wherein the third parameter is indicative of the time required for the grid to be restored to its operating state prior to the failure,
wherein a state of the first Markov chain is defined as a number of good paths between the distributed automation power grid and a central controller of the distributed automation power grid and transitions in the first Markov chain represent communication path failures and communication path repairs,
wherein a state of the second Markov chain is defined as a difference between available power for back-up failure, restoration and power demand and transitions in the second Markov chain represent changes in available back-up power due to initiation of additional back-up units or reduced demand.

10. The system of claim 9, wherein the third parameter is computed by evaluating $$ESAIDI(\tau) = \sum_{j=1}^{C} \phi_j \tau \left( \frac{\overline{M}_j(\tau)}{\overline{D}_j(\tau)} \right).$$

11. The system of claim 9, wherein after isolating the first section an initial transition to a state of the first to third Markov chains is based on a probability that the communication network is operational after the failure and a probability that enough backup energy exists for the second group after the failure.

12. The system of claim 9, wherein the processor is further operative with the program to:
determine, based on the third parameter, an infrastructure investment to the distributed automation power grid.

13. The system of claim 9, wherein a state of the third Markov chain is defined by aggregating all of the distributed automation power grid elements that have power related equivalent behavior in terms of failure isolation and restoration and transitions in the third Markov chain represent rates at which failure isolation and restoration operations are performed.

14. The system of claim 13, wherein the third parameter is computed by evaluating the time required to transition from the initial failure state to the state that represents the successful execution of the failure identification, isolation and restoration operations.

15. The system of claim 9, wherein reactive power is incorporated into the second and third Markov chains.

16. A computer program product for assessing the survivability of a distributed automation power grid in response to a failure, comprising:
a non-transitory computer readable storage medium having computer readable program code embodied therewith, the computer readable program code comprising:
computer readable program code configured to perform the steps of:
generating a failure in a first section of a distributed automation power grid, wherein the grid is divided into a plurality of sections;
identifying the location of the first section and isolating the first section;
aggregating sections of the grid that are downstream from the first section into a first group and sections of the grid that are upstream from the first section into a second group;
computing, using a first Markov chain, a first parameter indicating whether a communication network of the grid is operational after the failure;
computing, using a second Markov chain, a second parameter indicating whether enough backup energy exists for the second group after the failure; and
computing, using a third Markov chain, a third parameter based on the first and second parameters, wherein the third parameter is indicative of the time required for the grid to be restored to its operating state prior to the failure, and the third parameter is computed by evaluating $$ESAIDI(\tau) = \sum_{j=1}^{C} \phi_j \tau \left( \frac{\overline{M}_j(\tau)}{\overline{D}_j(\tau)} \right).$$

* * * * *